Patented July 8, 1952

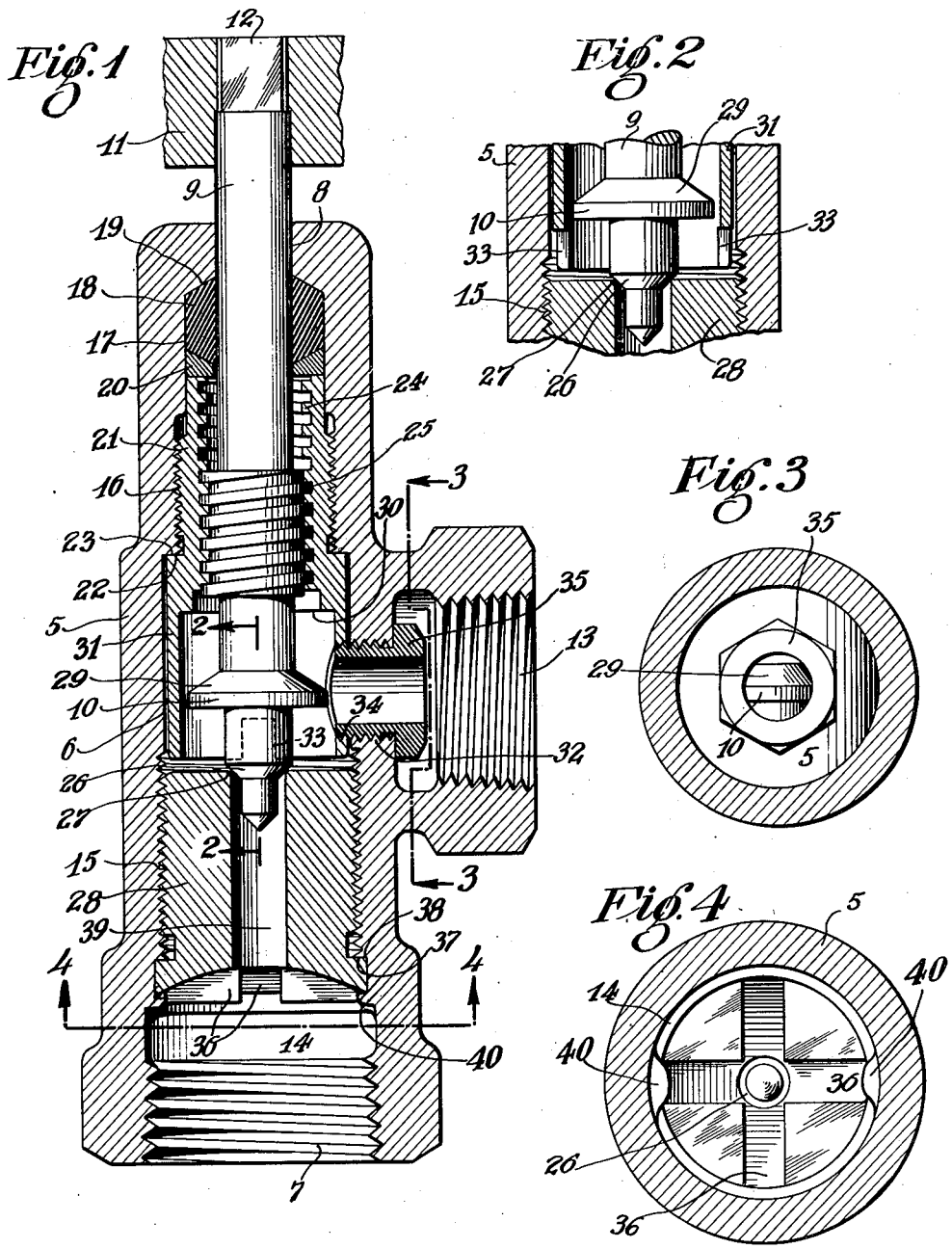

2,602,629

UNITED STATES PATENT OFFICE 2,602,629

TAMPERPROOF VALVE

Howard Hazen McChesney, Bala-Cynwyd, Pa., assignor to The Welsbach Corporation, Philadelphia, Pa., a corporation of Delaware Application May 22, 1948, Serial No. 28,577

2 Claims. (Cl. 251—50)

This invention relates to a valve device for controlling the flow of fluids and is particularly useful in controlling the flow of fluids which involve hazards to health or safety such as are involved for example, in the handling of gas especially in domestic installations.

The principal objects of the invention are to provide a valve which is absolutely tamper-proof so long as it is coupled in the line; to provide a valve the operating stem of which can be packed at the factory so as to be absolutely leakproof while at the same time readily and easily operable to open or close the same; to provide a construction in which all of the working parts are insertable either through one or the other of the fluid openings which the valve controls so that they are completely inaccessible to unauthorized persons once the valve has been coupled into the line which it is to control; and in general, to improve the efficiency, strength and durability of valves of this type as well as to reduce manufacturing and maintenance costs.

How the foregoing objects, together with such other objects as may appear hereinafter or are incident to my invention, are attained is illustrated in a preferred embodiment in the accompanying drawing wherein—

Figure 1 is a longitudinal section through the valve of my invention;

Figure 2 is a section on the line 2—2 of Figure 1;

Figure 3 is a section on the line 3—3 of Figure 1; and

Figure 4 is a section on the line 4—4 of Figure 1.

Referring to the drawing it will be seen that my improved valve comprises a housing or body 5 having an elongated central bore 6 at one end of which there is a threaded fluid opening 7 (in this instance the inlet opening) and at the opposite end of which there is an aperture 8 through which the operating stem 9 for the valve disc 10 is adapted to project. The stem 9 may be turned in either direction by any suitable type of handle 11 fragmentarily shown as fitting around the squared end 12.

At a point intermediate the inlet opening 7 and the stem aperture 8 the body 5 is provided with an internally threaded outlet opening 13 and it will be understood, of course, that the openings 7 and 13 are to be connected into the line which the valve is to control.

The bore 6 has a series of sections of gradually diminishing diameter beginning with the widest portion 14 at the inlet end 7 and continuing progressively with a somewhat narrower portion 15 which is partially threaded, as shown, following which there is a still narrower portion at 16 which is also threaded and finally a still narrower portion at 17 which latter is a smooth bore and is adapted to receive a resilient packing 18 which surrounds the stem 9 and abuts at the top against the under or inner wall of the body, there being a suitably sloped shoulder 19 for this purpose surrounding the aperture 8.

Below the resilient packing 18 I prefer to provide a metal gland ring 20 against the under face of which is adapted to abut the upper end of a combined gland nut and stem bushing 21 which latter is externally threaded, as shown, to cooperate with the threads at 16 so that the bushing may be screwed into place and its seat shoulder 22 brought into tight contact with the opposing shoulder 23 on the bore of the body. When the shoulders 22 and 23 are in abutting relationship the ring 20 is pressed against the packing 18 in order to suitably compress it for the sake of fluid tightness around the stem 9.

The interior of the bushing is provided with the threads 24 which cooperate with the external threads 25 on the stem 9 by means of which threads the stem can be moved so as to raise or lower the valve disc 10.

Below the disc 10 the stem is reduced in diameter to provide the step 26 which in this embodiment of the valve controls the incoming fluid flow, the step 26 being adapted to cooperate with the ring-like seat 27 which is provided at the upper end of the seat member 28.

The upper surface of the disc member 10 is sloped as indicated at 29 and this sloping surface is adapted to cooperate with the ring-like seat 30 on the under face of the bushing member. When the stem 9 is turned so as to bring the surface 29 against the seat 30 the valve is in its fully opened position and the contact between 29 and 30, the contact between shoulders 22 and 23 and the packing at 18 serve to absolutely prevent leakage around the stem 9 through the stem aperture 8. In the other direction the surface 26 when seated against the ring-like seat 27 completely closes the valve to any fluid flow, the valve being arranged to seat against the direction of flow.

The lower portion of the bushing 21 is formed as an annular depending skirt or apron 31 which projects or extends past the outlet opening 32 in the wall of the body which opening is in alignment with the threaded portion 13 of the outlet. The bushing 21 is insertable through the inlet opening 7 and the lower edge of the skirt 31 is suitably slotted as at 33 for reception of a wrench by means of which the bushing may be screwed tightly into place. After the bushing has been inserted and screwed into its proper position the skirt is tapped by means of a tool introduced through the opening 13 so as to provide an opening 34 in alignment with the opening 32 and the threaded connection 13, the openings 32 and 34 being threaded, as shown, for the reception of what I term a locking member or bushing 35 the head of which is suitably shaped to receive a wrench by means of which it can be screwed into position. When in its proper position, as shown in Figure 1, the inner end projects into the opening 34 in the skirt and acts as a lock for preventing any rotation of the bushing 21 under the influence of any turning moment which may be developed when the stem 9 is rotated. It will be understood that the fluid flows outwardly through the interior of the locking bushing.

The seat member 28 is also insertable through the inlet opening 7 and is provided at its lower end with suitable slots 36 for the reception of a tool or wrench by means of which it can be screwed into position where its external shoulder 37 abuts against the shoulder 38 on the bore of the body. After insertion it is prevented from unscrewing by staking with metal flowed from the wall of the bore, by means of an appropriate tool, to form one or more burs 40 preferably located so as to project into the adjacent end of a slot 36. Internally, of course, the seat member is provided with the channel 39 through which the fluid passes on its way to the outlet at 13.

It will be understood, of course, that the locking member 35 need not take exactly the form illustrated although I prefer this form. For example, a simple pin might be employed at the side of fluid passage.

From the foregoing, it will be apparent that all of the parts of my improved valve are insertable only through one or the other of the openings 7 and 13. After the latter are connected into the line which the valve controls the entire mechanism is absolutely tamper-proof so that no unauthorized person can alter adjustments or replace the packing unless he first removes the valve from the line, which latter, of course, should not be done except by authorized personnel. In this way all danger of leakage with its consequent hazards is practically eliminated. The valve is of sturdy construction, is highly efficient in operation and can be easily and relatively inexpensively manufactured and readily and simply maintained by properly authorized persons. In fact, all that it is necessary to do is to remove the valve if it needs attention and replace it with a new one, the old one being returned to the shop for repairs.

I claim:

1. A valve device having a body with a cylindrical bore, a valve stem aperture at one end of the bore, a fluid opening at the opposite end of the bore, a valve member with a stem, said valve member and stem being insertable through the said fluid opening with the stem adapted to project through said valve stem aperture, a valve stem bushing also insertable through said fluid opening and having external threads, threads in the bore into which said bushing is screwed, packing surrounding the stem between the end of the bushing and the inner wall of the body, threads on the valve stem and cooperating threads on the inside of the bushing, a seat piece also insertable through said opening and threaded into the bore, a fluid opening intermediate the valve stem aperture and said first mentioned fluid opening, said fluid openings having pipe connecting means, a skirt on the bushing which extends across said intermediate fluid opening, a hole in the skirt in alignment with the intermediate fluid opening, and a locking bushing insertable through and threaded into said intermediate fluid opening and adapted to project into the aligned hole in the skirt, said locking bushing containing a fluid passageway therethrough.

2. A valve comprising a body with an elongated bore having a fluid opening at one end and a valve stem aperture at the opposite end, a valve member with a stem, said valve member and stem being insertable through the said fluid opening with the stem adapted to project through said aperture, a valve stem bushing also insertable through said opening and having external threads, threads on the bore into which said bushing is screwed, packing surrounding the stem between the end of the bushing and the inner wall of the body, opposed seating shoulders on the wall of the bore and on the bushing, said bushing being adapted to be screwed into place to compress the packing and to bring said shoulders into seating relationship, threads on the valve stem and cooperating threads on the inside of the bushing, a seat piece also insertable through said opening and threaded into the bore, a fluid opening intermediate the valve stem aperture and said first mentioned fluid opening, a skirt on the bushing, and a locking member insertable through the intermediate opening and threaded through the wall of the body to project into an aperture in the skirt whereby to prevent rotation of the bushing under the influence of rotation of the stem.

HOWARD HAZEN McCHESNEY.

REFERENCES CITED

The following references are of record in the file of this patent:

UNITED STATES PATENTS

| Number | Name | Date |
|---|---|---|
| 625,954 | Huxley | May 30, 1899 |
| 845,134 | Whitaker | May 21, 1907 |
| 1,283,752 | Haynes | Nov. 5, 1918 |
| 1,374,621 | Wicker | Apr. 12, 1921 |
| 1,678,459 | Bowland | July 24, 1928 |
| 1,753,833 | Mueller | Apr. 8, 1930 |
| 1,890,357 | Barber | Dec. 6, 1932 |
| 2,410,404 | Buchanan | Nov. 5, 1946 |

FOREIGN PATENTS

| Number | Country | Date |
|---|---|---|
| 8,479 | Great Britain | 1911 |
| 587,751 | France | Jan. 22, 1925 |